(12) United States Patent
Siewertsen et al.

(10) Patent No.: US 7,445,286 B2
(45) Date of Patent: Nov. 4, 2008

(54) CHILD SEAT AND BELT SYSTEM

(75) Inventors: Adriaan Siewertsen, Eindhoven (NL); Roelof Van Driel, Eindhoven (NL)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 11/195,339

(22) Filed: Aug. 1, 2005

(65) Prior Publication Data
US 2006/0038436 A1 Feb. 23, 2006

(30) Foreign Application Priority Data
Aug. 2, 2004 (NL) .................................. 1026768
Apr. 1, 2005 (NL) .................................. 1028677

(51) Int. Cl.
*A47C 1/10* (2006.01)
*A62B 35/00* (2006.01)

(52) U.S. Cl. ............... 297/250.1; 297/256.15; 297/486; 297/487; 297/467

(58) Field of Classification Search ............. 297/250.1, 297/256.15, 486, 487, 488
See application file for complete search history.

(56) References Cited

U.S. PATENT DOCUMENTS

| | | | |
|---|---|---|---|
| 3,799,577 A * | 3/1974 | Colucci | 297/478 |
| 4,192,530 A * | 3/1980 | Cachia | 280/802 |
| 4,288,097 A * | 9/1981 | Ueda | 280/802 |
| 4,376,551 A | 3/1983 | Cone | 297/250 |
| 4,431,233 A | 2/1984 | Ernst | 297/468 |
| 4,662,683 A * | 5/1987 | Knoedler et al. | 297/488 |
| 4,738,489 A * | 4/1988 | Wise et al. | 297/487 |
| 5,061,012 A * | 10/1991 | Parker et al. | 297/467 |
| 5,709,408 A * | 1/1998 | Carraway, Jr. | 280/804 |
| 5,716,097 A * | 2/1998 | Peck et al. | 297/238 |
| 5,979,983 A | 11/1999 | Galbreath | 297/256.15 |
| 6,893,088 B2 * | 5/2005 | Kassai et al. | 297/250.1 |
| 2001/0025400 A1 | 10/2001 | Romca et al. | 24/31 |
| 2002/0070593 A1 | 6/2002 | Takayama | 297/250.1 |
| 2005/0179289 A1 * | 8/2005 | Fuller et al. | 297/250.1 |

* cited by examiner

*Primary Examiner*—Sarah B McPartlin
(74) *Attorney, Agent, or Firm*—Barnes & Thornburg LLP

(57) ABSTRACT

A child seat comprising a seat portion, a back support as well as belts that can be connected to a crotch member for securing a child in the child seat. A least one belt or the crotch member is provided with a spring element, by means of which the belt or the crotch member can be moved against spring force from a first position, in which the shoulder belt and the crotch member are disconnected, to a second position, in which the shoulder belt and the crotch member are connected.

21 Claims, 6 Drawing Sheets

CHILD SEAT AND BELT SYSTEM

The invention relates to a child seat comprising a seat portion, a back support as well as at least one shoulder belt that can be connected to a crotch member for securing a child in the child seat, wherein at least the shoulder belt can be moved against spring force by means of a spring element from a first position, in which the shoulder belt and the crotch member are disconnected, to a second position, in which the shoulder belt and the crotch member are connected.

The invention also relates to a belt system.

With such a child seat, which is known from U.S. Pat. No. 5,061,012, the crotch member is connected to a seat portion and ends of two shoulder belts are connected to a side of the back support remote from the seat portion. The ends of the shoulder belts remote from the back support are each connected to a barrier that is pivotally connected to the back support. In a position in which the barrier is pivoted away from the seat portion, a child can be placed into the child seat, after which the barrier is pivoted to a position in front of the child, in which position the shoulder belts extend over the child's shoulders. Subsequently, the crotch member is connected to the barrier, thus securing the child in the child seat.

The shoulder belts are connected to an automatic belt retractor on a side remote from the barrier, in which retractor the shoulder belts are rolled up under the influence of a spring force and from which they can be pulled against spring force.

The presence of both the automatic belt retractor and the barrier makes the known child vehicle seat relatively complex and costly. Moreover, a child seated in the child seat experiences the barrier as unpleasant, whilst in addition the child may come into contact with said barrier in case of a collision of a vehicle in which the child seat is mounted, so that there is a risk of injury.

The object of the invention is to provide a child seat in which a child can be retained in the child seat by means of a crotch member and at least one shoulder belt, whilst placing the child into the child seat will be relatively easy.

This object is accomplished with the child seat according to the invention in that the spring element is a spring sleeve positioned near the back support, through which spring sleeve the shoulder belt extends, whilst the spring sleeve can be moved against spring force from said first position to said second position together with the shoulder belt extending therethrough.

Since the shoulder belt is provided with a spring element, the shoulder belt will be held in the first position under the influence of spring force. In said position, the shoulder belt and the crotch member are spaced apart, thus forming a space that ensures that the shoulder belt and the crotch member do not form an impediment when the child is being placed into the child seat.

To interconnect the shoulder belt and the crotch member, said shoulder belt and said crotch member are moved to each other against spring force and interlocked in the second position.

With the child seat according to the invention, the length of the belt between the back support and the seat portion in said first position is at least substantially the same and preferably greater than in the second position. As a result, positioning the belt about the child is relatively easy in the first position.

Since the belt extends away from the other belt and the crotch member, a belt arrangement such that the belt will not form an impediment when the child is being placed into the child seat is realised in a simple manner in said first position.

Such a spring sleeve is easy to fit over belts that are already present in a child seat. In the first position, the belts do not lie on the seat portion or abut against a part of the back support that joins said seat portion.

A further advantage is the fact that the belts are capable of sliding movement through the sleeve, so that the length of the belt remains readily adjustable in a usual manner, whilst the spring sleeves have the advantage of providing belts that spring aside, as it were, upon disconnecting the belts and the crotch member.

For the sake of completeness it is noted that with a child seat that is known per se, in which a child is only secured in the child seat by means of a crotch member and belts, the belts as well as the crotch member are usually in contact with the seat portion and the back support in the first position, so that the belt must be manually moved aside upon placing the child into the child seat so as to prevent the child being seated on the belts. Frequently the belts and the crotch member fall back onto the seat portion during this operation, which is undesirable.

One embodiment of the child seat according to the invention is characterized in that the shoulder belt is held spaced from the seat portion under the influence of a spring force in said first position.

The shoulder belt may be rigidly connected to the back support on a side remote from the seat portion or extend through said back support. Since the shoulder belt portion has been moved in a direction away from the seat portion under the influence of a spring force, the shoulder belt is moved away from the part of the back support against which the child's back is being positioned in a relatively simple manner.

Yet another embodiment of a child seat according to the invention is characterized in that the child seat comprises at least two shoulder belts, and in that the shoulder belt portions of the shoulder belts are held in spaced-apart positions under the influence of spring force.

Since the shoulder belt portions are spaced apart in said first position, the space that is available between said shoulder belt portions is relatively large. When the child is being placed into the child seat, the child's head will be positioned in said space. Since the space is relatively large, the child's head will not come into contact with the shoulder belt portions, which are held in the first position under the influence of spring force.

Yet another embodiment of the child seat according to the invention is characterized in that a belt buckle, which can be connected to the crotch member, can be moved over the shoulder belt or a lap belt, whilst the child seat is provided with an element that is capable of deformation against spring force, which element extends along the shoulder belt or the lap belt, which belt buckle can be moved against the spring force of said deformable element to a position in which it is connected to the crotch member.

In the position in which it is disconnected from the crotch member, the belt buckle is moved towards the back support or the seat portion by means of the deformable element, so that the belt buckle will not form an impediment when a child is being seated on the seat portion. Moreover, a user who wants to connect the belt buckle to the crotch member can reach the belt buckle without difficulty. The belt buckle can be connected to the crotch member by subsequently moving the belt buckle towards the crotch member against the spring force of the deformable element.

Another embodiment of the child seat according to the invention is characterized in that the deformable element comprises an element that can be extended against spring force.

After being disconnected from the crotch member, the belt buckle is moved in a direction away from the crotch member by the extensible element. The belt extends from a position remote from the seat portion on the back support to a position on one side of the seat portion. After being disconnected from the crotch member, the belt buckle is moved to either one of said two positions by the extensible element, so that the belt buckle will not form an impediment when a child is being seated on the seat portion.

Yet another embodiment of the child seat according to the invention is characterized in that the extensible element is connected to the spring element.

In this way the belt buckle is moved in a direction away from the crotch member after being disconnected from the crotch member not only as a result of the contraction of the extensible element but also as a result of the movement of the spring element.

Yet another embodiment of the child seat according to the invention is characterized in that the child seat comprises at least two lap belts, which are each positioned near a longitudinal side of the seat portion with a lap belt portion thereof, which lap belt portions are held in a position spaced from the seat portion under the influence of spring force in said first position.

In this way no lap belts will be present on the seat portion in the first position, so that the child can be seated on the seat portion without the belts forming an impediment.

Yet another embodiment of the child seat according to the invention is characterized in that the crotch member is held in a position spaced from the back support under the influence of spring force in said first position.

In this way the crotch member will not lie on the part of the seat portion on which the child will be seated in said first position. Consequently, the crotch member will not form an impediment when the child is being placed into the child seat.

Yet another embodiment of the child seat according to the invention is characterized in that the child seat comprises at least one shoulder belt as well as a lap belt connected thereto, with a free passage for passing an arm therethrough being present between the back support, the seat portion, the lap belt and the shoulder belt in said first position.

In this way the child can pass its arms through the free arm passages without any difficulty, after which the belts and the crotch member can be coupled in said second position. This further simplifies the placing of a child into the child seat and the subsequent interlocking of the belts and the crotch member.

The invention will now be explained in more detail with reference to the drawings, in which.

Like parts are indicated by the same numerals in the figures.

Figure 1:
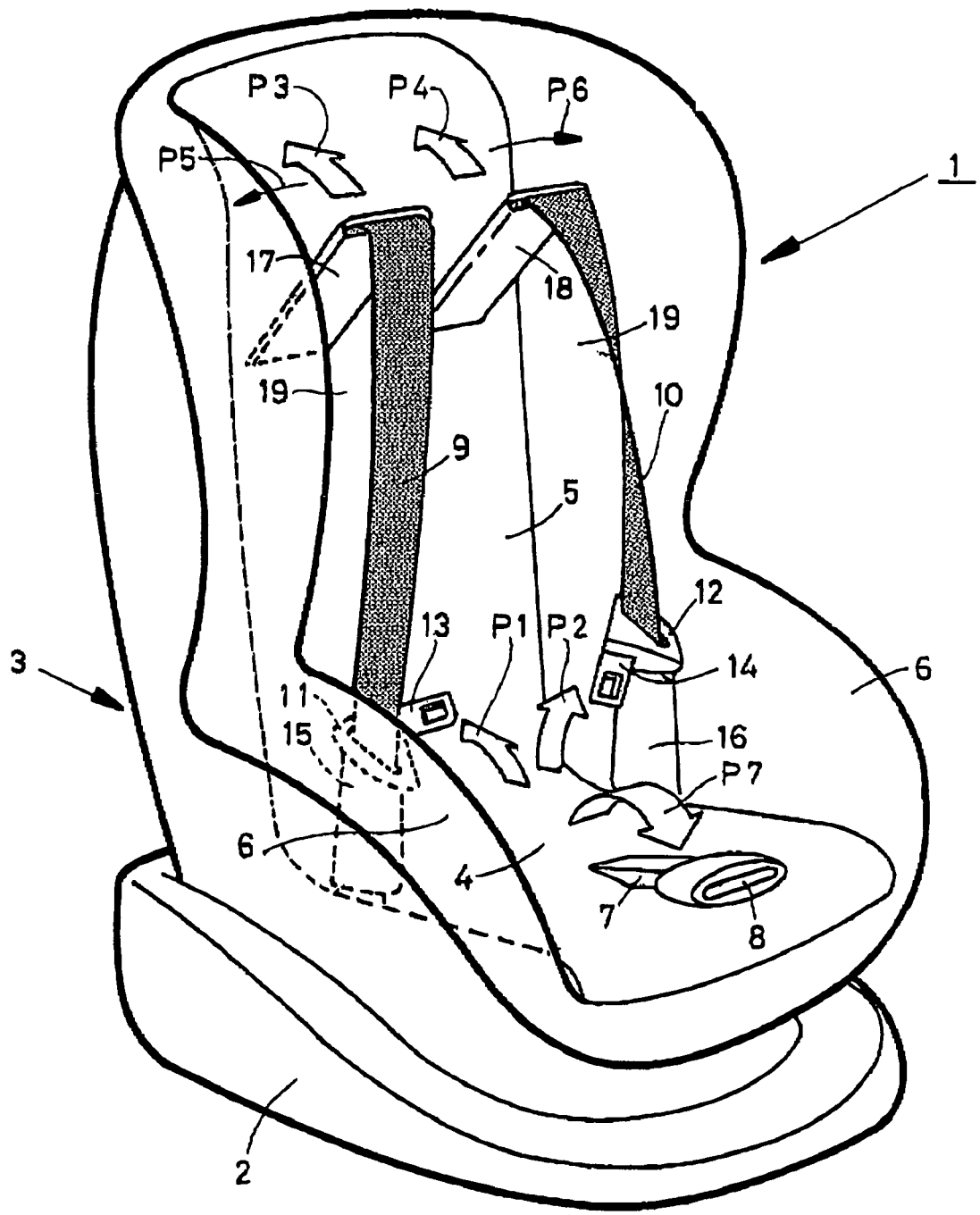
FIG. 1 is a perspective view of a child seat according to the invention, with the belts and the crotch member in the first position.

FIG. 1 shows a child seat 1 according to the invention, which comprises a chassis 2 and a seat 3 that is tiltably connected to the chassis 2. The seat 3 comprises a seat portion 4 and a back support 5 connected thereto. The seat portion 4 is bounded by armrests 6 on both longitudinal sides. The child seat 1 comprises a crotch member portion 7, which is connected to the seat portion 4 with one end and which is provided with a buckle lock 8 on a side remote from the seat portion 4.

The child vehicle seat 1 further comprises two belts 9, 10, which are each connected to the seat 3 with one end at the location of a transition between the seat portion 4 and the armrests 6. The ends of the belts 9, 10 remote from the seat portion extend through the back support 5 and are adjustable for length on a rear side of the back support 5, in dependence on the size of the child to be secured in the child vehicle seat 1. Belt buckles 11, 12 can slide over the belts 9, 10, which belt buckles 11, 12 are each provided with a buckle tongue, which can be interlocked with the buckle lock 8. The lower portions of the belts 9, 10 form lap belts, whilst the upper portions form shoulder belts.

The child seat 1 as described so far is known per se and will not be explained in more detail herein, therefore. The child seat 1 according to the invention comprises two spring sleeves 15, 16, which are connected to the seat 3 at the location of the transition between the seat portion 4 and the armrests 6, through which sleeves 15, 16 the belts 9, 10 extend. The attachment of the spring sleeves 15, 16 to the seat 3 is such that the sleeves 15, 16 move in the directions indicated by the arrows P1, P2 to first positions shown in FIG. 1, in which they abut against the armrests 6, under the influence of spring force.

The child seat 1 according to the invention furthermore comprises two spring sleeves 17, 18, which are connected to the back support 5 with one end at the location of the passages of the belts 9, 10 through the back support 5. The belts 9, 10 extend through the sleeves 17, 18 and are slidably accommodated therein. The sleeves 17, 18 and the portions of the belts 9, 10 present therein are moved in the directions indicated by the arrows P3, P4 to the first positions as shown in FIG. 1 under the influence of the spring force of the spring sleeves (spring biased elements) 17, 18. The extent to which the spring sleeves 17, 18 are moved in the direction indicated by the arrows P3, P4 partially depends an the length of the belts 9, 10. If the belts 9, 10 are relatively long, the sleeves 17, 18 will abut against the back support under the influence of the spring force.

Preferably, the sleeves 17, 18 are shaped such that the sleeves 17, 18 can also be pivoted in directions P5, P6 away from each other under the influence of the spring force.

The crotch member 7 is provided with an internal spring, by means of which the crotch member 7 is moved in the direction indicated by the arrow P7, away from the back support 5, to a first position in which it abuts against the seat portion 4.

In the first positions of the belts 9, 10 as shown in FIG. 1, lap belt portions are present in the spring sleeves 15, 16, which lap belt portions have been moved to the positions in which they abut against the armrests 6 by the spring sleeves 15, 16. Present within the sleeves 17, 18 are shoulder belt portions that have been to upwardly extending positions as shown in FIG. 1 by the spring sleeves 17, 18.

In the position of the sleeves 17, 18 that is shown in FIG. 1, the belts 9, 10 form arm passages 19 with the seat portion 4 and the back support 5, through which passages a child seated in the child seat 1 can pass its arms.

Figure 2:
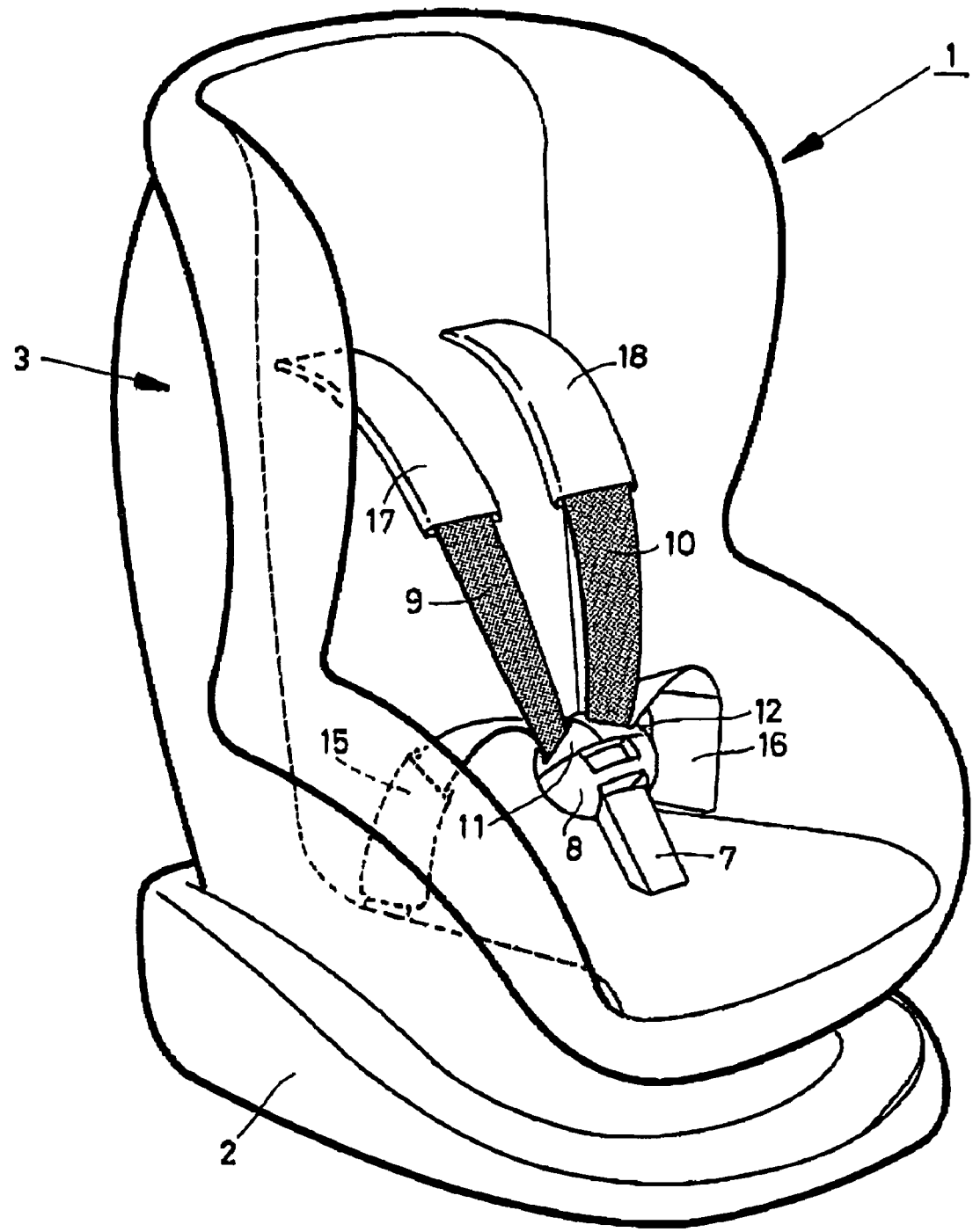
FIG. 2 is a perspective view of the child seat that is shown in FIG. 1, with the belts and the crotch member in the second position.

It will be understood that in the position of the belts 9, 10 and the crotch member 7 that is shown in FIG. 1, a child can be placed on the seat portion 4 without any difficulty, without the belts 9, 10 or the crotch member 7 forming an impediment. Also the part of the back support 5 against which the child's back will abut is clear of belts 9, 10. The child's head is positioned between the sleeves 17, 18. The space that is available between the sleeves 17, 18 is sufficiently large, so that the child will not be impeded by the sleeves 17, 18. After the child's arms have been passed through the arm passages 19, a parent, for example, will take hold of the buckle tongues 13, 14 and pivot the crotch member 7 in the opposite direction of the arrow P7, so that the buckle tongues 13, 14 can be inserted into the buckle lock 8 and be interlocked therewith. The sleeves 15, 16, 17, 18 will be moved against spring force in the opposite directions of the arrows P1, P2, P3, P4, P5, P6 to the positions that are shown in FIG. 2. In said second positions of the belts 9, 10 and the crotch member 7 that are shown in FIG. 2, the belts 9, 10 and the crotch member 7 are interlocked and the child is firmly retained in the child seat 1.

When the child is to be taken out of the child seat 1, the buckle lock 8 is unlocked, so that the buckle tongues 13, 14 can be removed from the buckle lock 8. The belts 9, 10 will subsequently be moved in the directions indicated by the arrows P1-P6 under the influence of the spring sleeves 15, 16, 17, 18, as a result of which the belts 9, 10 will move away from the child and the child can be taken out of the child seat without any difficulty. In said first disconnected position, the length of the belts between the back support 5 and the seat portion 4 preferably remains at least substantially the same as or becomes greater than in the second, connected position. The length of the belts can be increased by moving the belts through the back support. In this way a relatively large arm passage is obtained, which makes it easier to place the child into the child seat. After the buckle lock 8 has been unlocked, the crotch member will also be automatically pivoted in the direction indicated by the arrow P7, into the position that is shown in FIG. 1, under the influence of the spring force, in which position the crotch member 7 does not form an impediment when the child is being taken out of the child seat 1.

Figure 3:
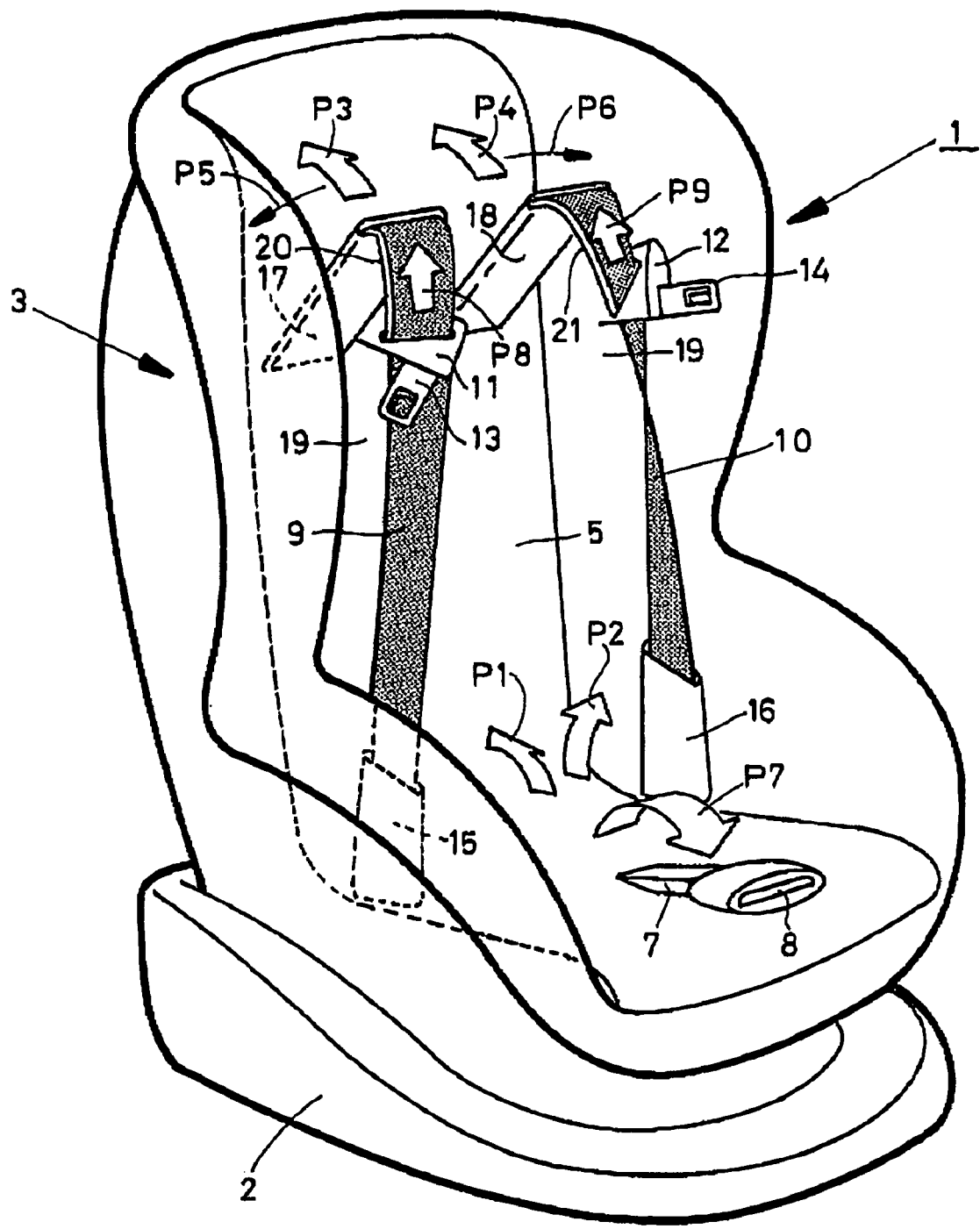
FIG. 3 is a perspective view of another embodiment of a child seat according to the invention, with the belt, the belt buckles and the crotch member in the first position.
Figure 4:
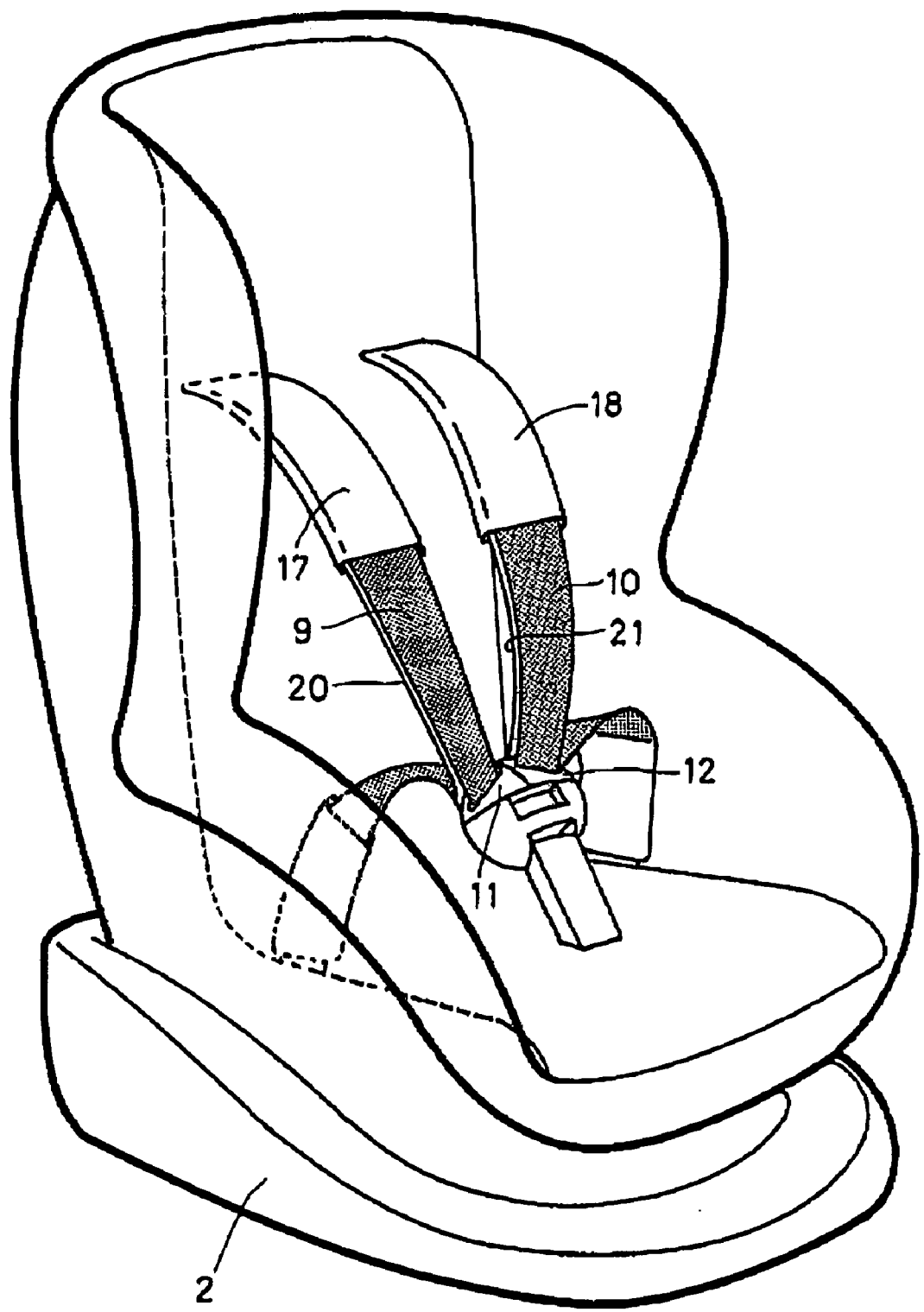
FIG. 4 is a perspective view of the child seat that is shown in FIG. 3, with the belts, the belt buckles and the crotch member in the second position.

FIGS. 3 and 4 show another embodiment of a child seat according to the invention, which is different from the child seat that is shown in FIGS. 1 and 2 in that it is provided with extensible elements 20, 21 extending between the sleeves 17, 18 and the buckle tongues 11, 12. The extensible elements are elastic straps, for example. In the position that is shown in FIG. 3, in which the buckle tongues 11, 12 are disconnected from the crotch member 7, the buckle tongues 11, 12 will be positioned near the back support 5 under the influence of the elasticity of the extensible elements 20, 21, because the buckle tongues 11, 12 have been moved in the directions indicated by the arrows P8, P9 under the influence of the extensible elements 20, 21.

When the buckle tongues 11, 12 are being connected to the buckle lock 8 that is attached to the crotch member 7, the buckle tongues 11, 12 are moved towards the buckle lock 8 against the spring force of the extensible elements 20, 21 and interlocked therewith.

Figure 5:
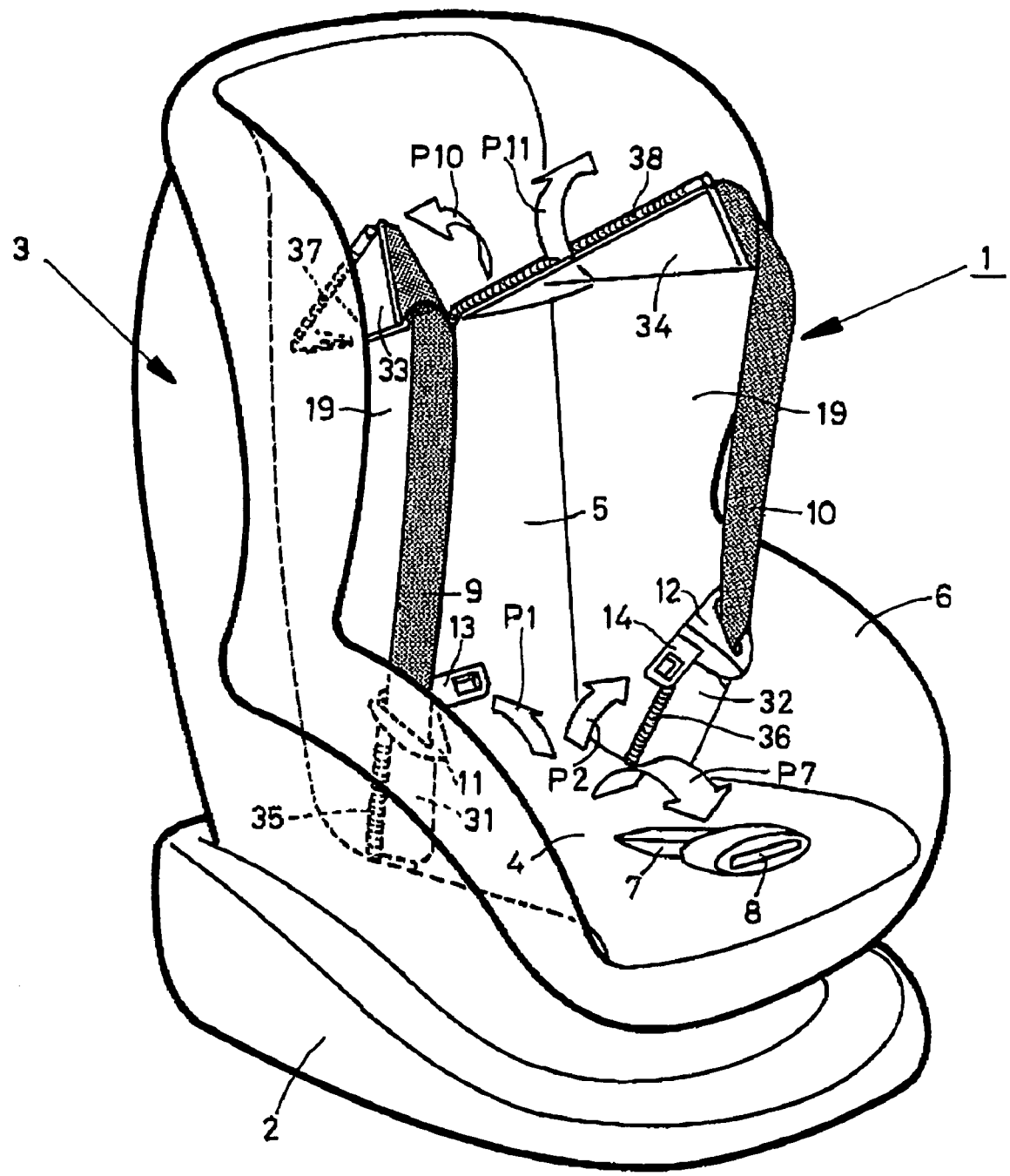
FIG. 5 is a perspective view of yet another embodiment of a child seat according to the invention, with the belt, the belt buckle and the crotch member in the first position.
Figure 6:
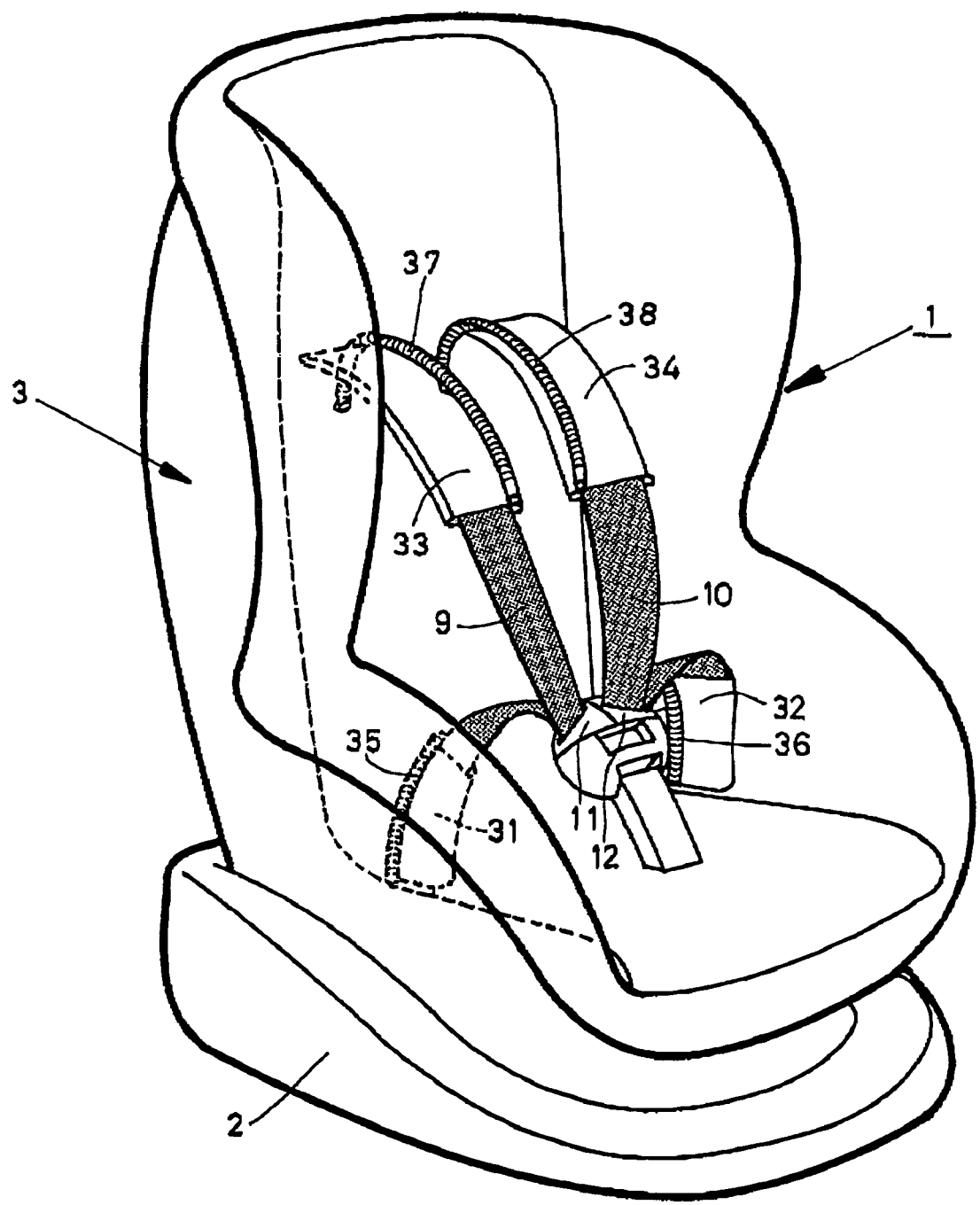
FIG. 6 is a perspective view of the child seat that is shown in FIG. 5, with the belts, the belt buckle and the crotch member in the second position.

FIGS. 5 and 6 show yet another embodiment of a child seat according to the invention, which largely corresponds to the child seat that is shown in FIGS. 3 and 4. One difference is the fact that the child seat, instead of being provided with spring sleeves 15, 18, is provided with fabric sleeves 31,32,33,34 and wire springs 35,36,37,38 extending along the sleeves 31-34. The wire springs 35, 36 are connected to the seat portion 4 on either side of said seat portion 4. The sleeves 31-34 are held in the first positions shown in FIG. 5 under the influence of the wire springs 35-38. The sleeves 33, 34 have been moved apart and away from the seat portion 4, in the directions indicated by the arrows P10 and P11, by the action of the wire springs (spring biased elements) 37, 38. When the buckle tongues 11, 12 are being connected to the buckle lock 8 that is attached to the crotch member 7, the buckle tongues 11, 12 are moved towards the buckle lock 8 against the spring force of the wire springs 35-38 and interlocked therewith.

Of course it is also possible to have the deformable elements extend through the back support or the seat portion and connect them to the child seat 1 on a rear side or a bottom side thereof.

It is also possible, of course, to move only the shoulder belt portions by means of spring elements.

Instead of using spring sleeves, it is also possible to use spring elements that are integrated in the belts 9, 10.

The child seat can be used in a car, on a bicycle, in a stroller or as a highchair.

It is also possible to connect the extensible elements directly to the back support 5 rather than use spring sleeves.

It is also possible to use the belt system according to the invention for securing a grown-up person in a vehicle, such as a car or an aeroplane.

The person can seat himself in the vehicle in the first position, in which the spring sleeve has moved the shoulder belt away from a back support.

Subsequently, said person moves the shoulder belt to a second position against the spring force of the sleeve, in which position the shoulder belt is locked against movement.

The invention claimed is:

1. A child vehicle seat comprising
a seat portion,
a back support portion of the seat,
a shoulder belt adapted to be connected to a crotch member for securing a child in the child seat,
wherein the shoulder belt can be moved against spring force by means of a spring biased element from a first position, in which the shoulder belt and the crotch member are disconnected, to a second position, in which the shoulder belt and the crotch member are connected,
characterized in that the spring biased element extends directly from the back support portion of the seat and the shoulder belt extends through a sleeve of the spring biased element, whilst the spring biased element can be moved against spring force of the spring biased element from said first position to said second position together with the shoulder belt extending therethrough and held against the spring force of the spring biased element in the second position.

2. A child vehicle seat according to claim 1, characterized in that the shoulder belt is held spaced from the seat portion under the influence of the spring force in said first position.

3. A child vehicle seat according to claim 2, characterized in that the child seat comprises at least two shoulder belts, and in that the shoulder belt portions of the shoulder belts are held in spaced-apart positions under the influence of spring force.

4. A child vehicle seat according to claim 1, characterized in that the child seat comprises at least two shoulder belts, and in that shoulder belt portions of the shoulder belts are held in spaced-apart positions under the influence of spring force in said first position.

5. A child vehicle seat according to claim 1, characterized in that a belt buckle, which can be connected to the crotch member, can be moved over the shoulder belt or a lap belt, wherein the belt buckle can be moved against the spring force of said spring biased element to a position in which it is connected to the crotch member.

6. A child vehicle seat according to claim 5, characterized in that the spring biased element comprises an element that can be extended against spring force.

7. A child vehicle seat according to claim 6, characterized in that the extensible element is connected to the spring biased element.

8. A child vehicle seat according to claim 1, characterized in that the child seat comprises at least two lap belts, which are each positioned near a longitudinal side of the seat portion with a lap belt portion thereof, which lap belt portions are held in a position spaced from the seat portion under the influence of spring force in said first position.

9. A child vehicle seat according to claim 8, characterized in that the belt that can be moved against spring force is provided with a spring fitted in the belt.

10. A child vehicle seat according to claim 1, characterized in that the crotch member is held in a position spaced from the back support under the influence of spring force in said first position.

11. A child vehicle seat according to claim 1, characterized in that the belt that can be moved against spring force is provided with a spring fitted in the belt.

12. A child vehicle seat according to claim 1, characterized in that the child seat comprises at least one shoulder belt as well as a lap belt connected thereto, with a free passage for passing an arm therethrough being present between the back support, the seat portion, the lap belt and the shoulder belt in said first position.

13. A child vehicle seat adapted to be secured to a passenger vehicle seat comprising:
 a seat portion;
 a back support portion of the seat;
 a spring biased sleeve extending directly from a surface of the back support;
 a shoulder belt extending through the spring biased sleeve, wherein the shoulder belt can be moved from a first position wherein the shoulder belt does not hold a person in the seat to a second position wherein the shoulder belt holds a person in the seat while the spring biased sleeve is held against spring force of the spring biased sleeve.

14. The child vehicle seat of claim 13, further comprising: at least one other spring biased sleeve extending directly from the seat portion, wherein the shoulder belt can be moved from a first position to a second position against spring force of the spring biased sleeve.

15. The child vehicle seat of claim 13, wherein the spring biased sleeve extends directly from the back support when the shoulder belt is in the first position and in the second position.

16. The child vehicle seat of claim 13, wherein the back support is configured to support a child's back when the child occupies the child seat.

17. A child vehicle seat comprising
 a seat portion having a top, a bottom, a back, a front, and sides,
 a back support portion of the seat,
 a shoulder belt that can be connected to a crotch member for securing a child in the child seat,
 a sleeve surrounding a portion of the shoulder belt,
 wherein the sleeve is biased to hold the shoulder belt in a first position, in which the shoulder belt and the crotch member are disconnected and the shoulder belt is held to enable placement of the child in the seat, and wherein the sleeve is adapted to move to a second position, in which the shoulder belt and the crotch member are connected and a child in the seat is restrained by the shoulder belt,
 characterized in that the sleeve is a spring biased member and the sleeve is moved against its spring force when the sleeve is moved from the first position to the second position with the shoulder belt extending therethrough and wherein the spring biased member extends directly from the back support portion of the seat.

18. The child vehicle seat of claim 17, wherein another sleeve extends forward from the back support, surrounds a portion of another shoulder belt and holds the another shoulder belt in the first position, in which the another shoulder belt and the crotch member are disconnected and the another shoulder belt is held to enable placement of the child in the seat, and wherein the another sleeve is adapted to move to a second position, in which the another shoulder belt and the crotch member are connected and a child in the seat is restrained by the another shoulder belt.

19. The child vehicle seat of claim 17, wherein the child seat includes an arm rest and the another sleeve extends from between the arm rest and a side of the seat portion.

20. The child vehicle seat of claim 17, wherein the sleeve extends from, and is connected to, the back support.

21. The child vehicle seat of claim 17, wherein
 the shoulder belt comprises a left shoulder belt,
 a right shoulder belt,
 the sleeve surrounds a portion of the left shoulder belt,
 a second sleeve surrounds a portion of the right shoulder belt,
 wherein the sleeve and second sleeve are biased to hold the shoulder belts in a first position in which the shoulder belts and the crotch member are disconnected and the belt portions are held apart to enable placement of the child in the seat, and wherein the sleeves are adapted to move to a second position in which the shoulder belts and the crotch member are connected and a child in the seat is restrained by the shoulder belts.

* * * * *